United States Patent [19]
Efantis et al.

[11] Patent Number: 5,847,910
[45] Date of Patent: Dec. 8, 1998

[54] FAULT PROTECTION DEVICE IN A TRANSFORMER

[75] Inventors: Antonios Efantis, Don Mills; Nicolas Alexandris, Thornhill, both of Canada

[73] Assignee: Allanson International Inc., Toronto, Canada

[21] Appl. No.: 926,935

[22] Filed: Sep. 10, 1997

[51] Int. Cl.⁶ .................................................. H02H 7/04
[52] U.S. Cl. ................................. 361/36; 361/38; 361/78
[58] Field of Search ............................... 361/35, 36, 38, 361/42, 39–41, 46, 78, 86, 93, 100–102; 336/160, 165, 214–217

[56] References Cited

U.S. PATENT DOCUMENTS

| | | | |
|---|---|---|---|
| 3,863,109 | 1/1975 | Emanuel et al. | 361/35 |
| 4,241,324 | 12/1980 | Douglass et al. | 336/217 |
| 4,400,675 | 8/1983 | Thomas | 336/160 |
| 4,488,136 | 12/1984 | Hansen et al. | 336/215 |
| 4,562,384 | 12/1985 | Owen | 315/276 |
| 5,168,422 | 12/1992 | Duncan | 361/836 |
| 5,241,443 | 8/1993 | Efantis | 361/36 |

*Primary Examiner*—Jeffrey Gaffin
*Assistant Examiner*—Michael J. Sherry

[57] ABSTRACT

A fault protection device incorporated in a transformer having a primary winding and at least two secondary windings connected to ground, and having a sensing coil to sense the fluxes generated by each of the secondary windings and generating a flux signal when an imbalance in the fluxes in the secondaries is detected and in which the sensing coil is in the form of at least two sensing coil portions, the sensing coil portions being positioned near but spaced from the sides of the secondary windings, the flux signal being constituted by a voltage induced in the sensing coil by fluxes produced by the secondary windings, and a switch connected to the sensing coil and connected in series with a power supply and at least one terminal of the primary winding, the switch being conditioned to an open condition in response to the flux signal to isolate the primary winding from the power supply.

10 Claims, 5 Drawing Sheets

FIG. 3

FAULT PROTECTION DEVICE IN A TRANSFORMER

FIELD OF THE INVENTION

The present invention relates to circuit fault protection devices and in particular to a transformer having a circuit fault protection device.

BACKGROUND OF THE INVENTION

Protection devices for electrical circuits are well known in the art and typically function to isolate the energized electrical circuit from a power supply when a fault in the circuit is detected. These devices usually were based on the use of a current transformer.

The current transformer is operable to detect an imbalance in the current on each line occurring due to a fault in the circuit. The output on the current transformer is used to trip a relay so that the power supply lines passing through the current transformer are isolated from the power supply when the fault occurs.

Protection devices for other devices or circuits besides power supply lines are desirable. For instance, it is desirable to provide circuit fault protection in a neon or luminous tube transformer since these devices typically are used to step a conventional 120 volt power supply up to 15,000 volts. In this type of circuit, many problems can arise if circuit faults occur at the secondary side of the transformer. For example, an arcing ground fault may develop in the wiring or at the tube receptacles due to aging, dirt accumulation, and the like and this type of fault may exist indefinitely presenting a serious fire hazard since any combustible materials in the vicinity of the arc are likely to ignite. In addition if the neon tube breaks, the secondary windings of the transformer along with the high voltage wiring will be subjected to the full open circuit voltage again creating a possible fire hazard and increasing the risk of electrical shock since the secondary windings are energized but the sign is not lit.

Current transformers are not convenient or economical in all applications. In circuits using neon or luminous tube transformers, the use of a current transformer to detect the occurrence of a ground fault is impractical. This is in view of the fact that when using a current transformer, the two high voltage leads from the secondary or the secondary winding midpoint before it is grounded have to pass through the current transformer. If the high voltage leads are passed through the current transformer, the current transformer must be extremely well insulated. Alternatively, if the midpoint ground conductor is passed through the current transformer, internal modification of the luminous tube transformer is required. Both approaches add considerable cost and complexity.

It is therefore an object of the present invention to provide a novel transformer fault protection device and a transformer incorporating such a device.

BRIEF SUMMARY OF THE INVENTION

Broadly stated one aspect of the present invention provides a circuit fault protection device incorporated in a transformer having a primary and at least two secondaries connected to ground comprising:

flux sensing coil means for sensing the flux in the magnetic core generated by each of said secondaries and generating a control signal when an imbalance in the fluxes generated by said secondaries is detected; and switch means to be connected in series with a power supply and at least one terminal of said primary, said switch means being conditioned to an open condition in response to said control signal.

A transformer having a primary winding and a pair of secondary windings connected in series with the midpoint of the series circuit being connected to ground incorporates the fault sensing protection device, consisting of a flux sensing coil adjacent the magnetic shunts between the primary coil and the two secondary coils.

In one embodiment, it is preferred that the sensing means is in the form of single, continuous wound coil that extends from one core shunt to the other and senses the flux induced in the magnetic core by each secondary coil simultaneously. The coil senses an imbalance in the fluxes produced by the two secondary windings and thus detects a fault.

In another embodiment the sensing coil is placed inside the core window around the two magnetic shunts and adjacent to the secondary windings such that it senses the flux differential, if any, produced by the secondaries.

It is also preferred that the device includes comparing means which receives the output voltage from the sensing means as well as a threshold voltage and provides a signal to the switch means to isolate the transformer primary winding from the power supply only when the flux differential signal is detected as being greater than the threshold voltage.

Preferably the device also includes indication means for providing a visual indication that the switch means has isolated the transformer primary winding from the power supply and reset means for resetting the switch means to reconnect the transformer primary winding to the power supply once the fault has been corrected.

In one embodiment, it is preferred that the switch means is in the form of a semiconductor switch which is connected in series with the transformer primary winding and which is operable to isolate the transformer primary winding from the power supply upon conditioning by the comparing means.

In another embodiment, it is preferred that the switch means is in the form of a pair of relay contacts, each of which is connected in series with opposite terminals of the transformer primary winding with the relay contacts being operable to isolate both terminals of the primary winding from the power supply in response to the output of the comparing means.

The present invention provides advantages in that if a fault occurs, the transformer primary winding is isolated from the power supply thereby substantially eliminating the possibility of electrical shock from occurring. Moreover, since a threshold voltage must be reached before the transformer primary winding is isolated from the power supply, small imbalances in the voltages at the transformer secondary windings occurring due to other reasons besides faults do not result in the isolation of the transformer primary winding from the power supply.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 1:
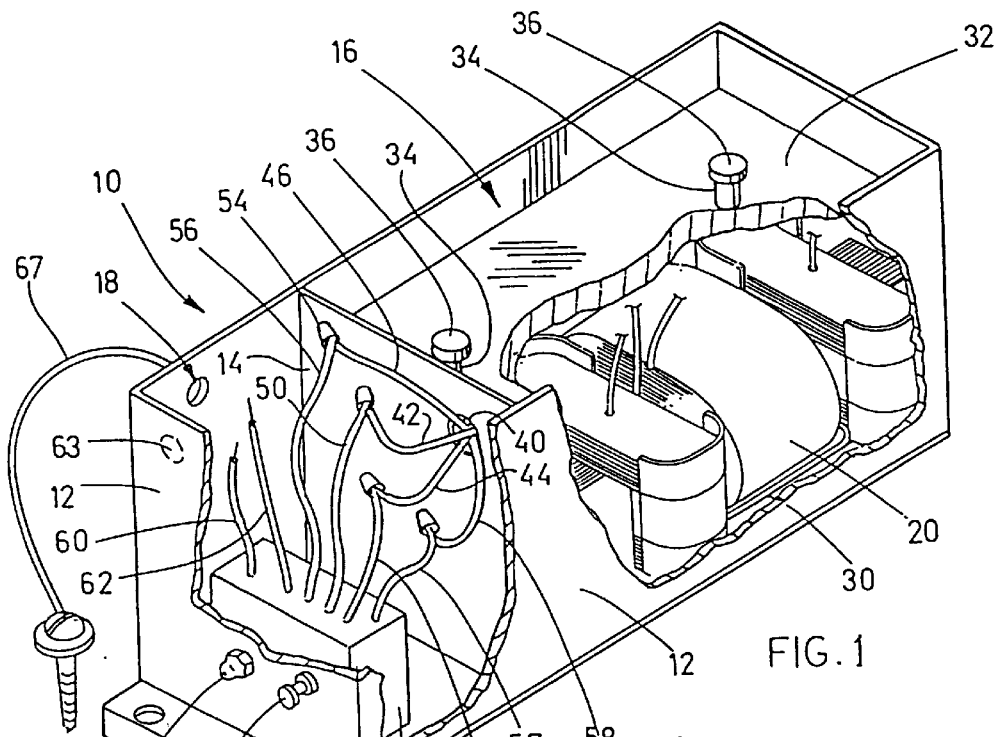
FIG. 1 is a partially cut-away perspective view of a luminous tube transformer incorporating a fault protector.
Figure 2:
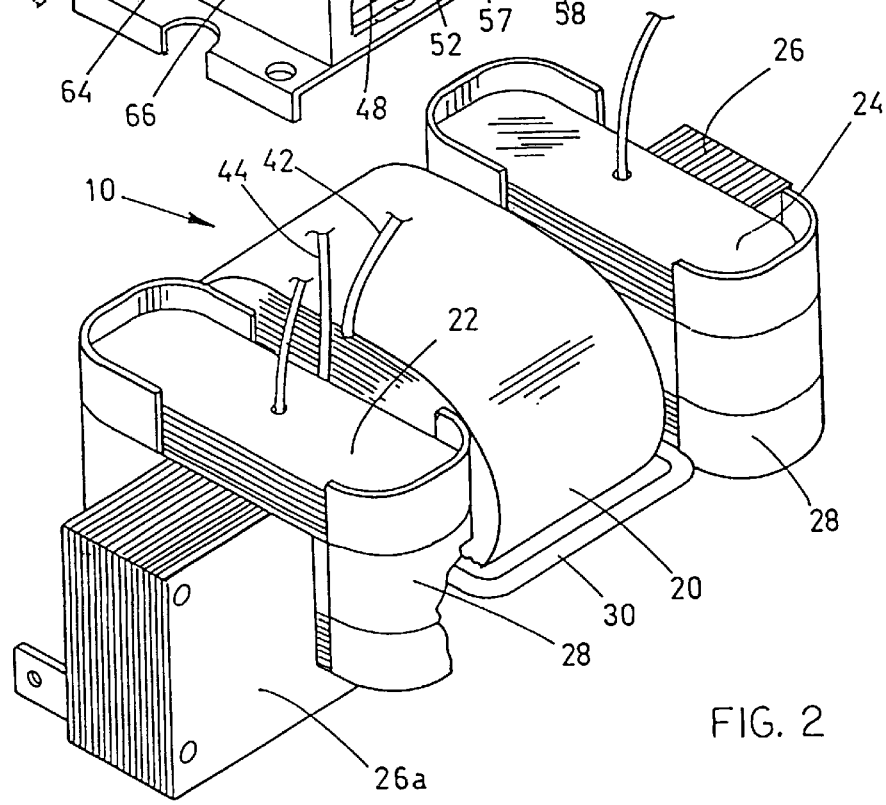
FIG. 2 is a perspective view of a portion of the transformer and transformer fault protector shown in FIG. 1.
Figure 3:
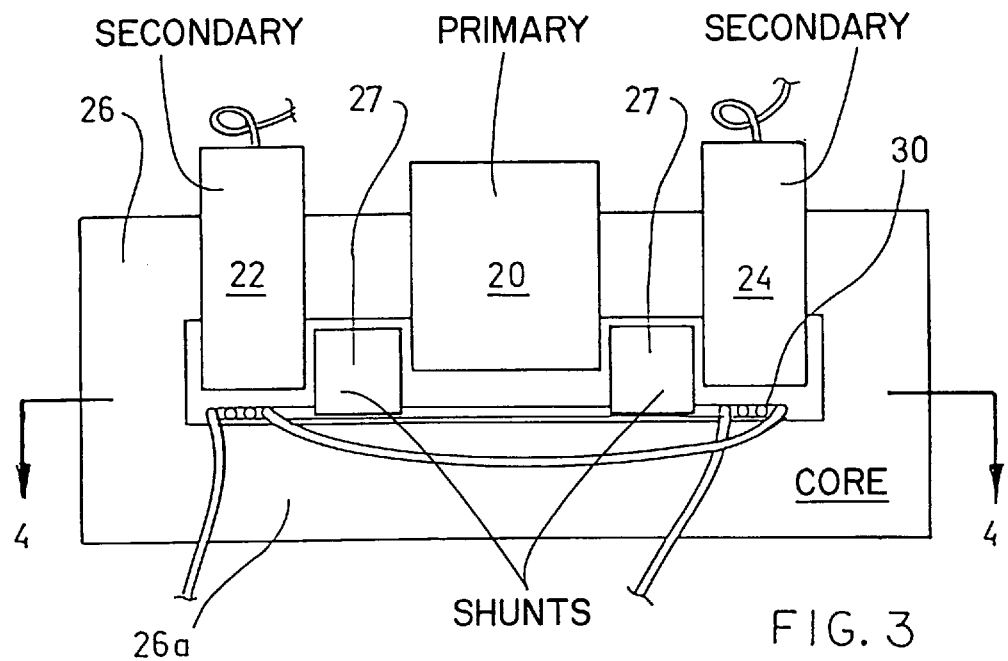
FIG. 3 is a side elevational view of the core, and the two shunts, and the sensing coil.

Referring now to FIGS. 1 to 3 the invention is illustrated in incorporated a luminous tube or neon transformer shown and generally indicated by reference numeral 10.

For the purposes of illustration of the invention the transformer includes a housing 12 having an inner wall 14 separating the interior of the housing into two compartments 16, 18 respectively. Compartment 16 houses the transformer windings. As can be seen, the neon transformer 10 includes a single primary winding 20 and a pair of secondary windings 22, 24 respectively located on opposite sides of and spaced from the primary winding 20. The secondary windings 22, 24 are connected in series with the midpoint of the series circuit being connected to ground GND via conductor 25. A core loop 26 and return loop portion 26a, formed from magnetizable material passes through the primary winding and the secondary windings. Magnetic shunts (FIGS. 3 and 4) 27 are also provided between the secondary windings 22, 24 and the primary winding 20. Insulation 28 surrounds the ends of the secondary windings 22, 24 and the lower sides of the secondaries overlie the core return 26a.

Figure 4:
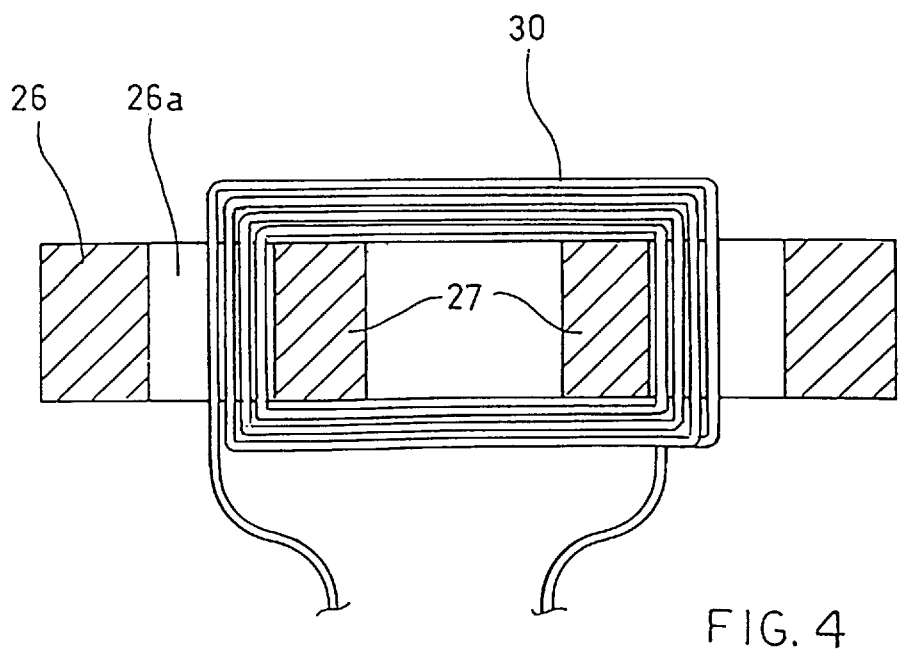
FIG. 4 is a section along the line 4—4 of FIG. 3.

The fault protector comprises a flux sensing coil 30 consisting of a plurality of continuous windings, forming a generally rectangular shape in plan (FIG. 4). The sensing coil 30 lies on the lower portion 26A of core 26. Sensing coil 30 extends around shunts 27 so that each end portion of coil 30 underlies a respective secondary 22, 24. In this way the single sensing coil 30 is continuously sensing the magnetic flux produced by each secondary. An asphalt compound 32 fills the compartment 16 so that the transformer windings, core and magnetic shunts as well as the sensing coil 30 are buried. However, a pair of threaded rods 34, each of which is electrically connected to respective secondary windings, projects upwardly from the top surface of the asphalt compound 32. A plastic cap 36 threadably engages with each rod 34 to permit conductors leading from the transformer load to pass through cut-outs not shown formed through the outer wall of the transformer housing 12 and be electrically connected and secured to the rods 34.

The interior wall 14 has a circular cut-out 40 formed through it to allow conductors 42, 44 leading from the primary winding 20 and a conductor 46 extending from the coil 30 to pass into the other compartment 18. The conductors 42, 44, 46 and 58 are connected to detection and switching circuitry forming the remainder of the fault protection device as will be described herein.

A smaller housing 48 is located within the compartment 18 and houses the detection and switching circuitry mentioned previously. A number of conductors extend from the housing 48. Two conductors 50, 52 are connected to opposite ones of the transformer primary conductors 42, 44 respectively via insulated cap connectors 54 and one conductor 56 is connected to conductor 46 extending from the coil. Conductor 57 in housing 48 is connected to conductor 58 connected to sensing coil 30. Two other conductors, namely a line conductor 60 and a neutral conductor 62 extend from the housing 48 and pass through a cut-out 63 formed through a wall of the housing 12 to permit the transformer 10 and the fault protector to be connected to a power supply. Located on the outer wall of the housing 12 adjacent the compartment 18 is an LED 64 and a reset switch 66, both of which are in communication with and form part of the detection and switching circuitry as will be described herein below. A housing ground 67 is provided for grounding the housing 12. A further housing conductor 68, connects the housing to the switching circuit described in FIG. 5.

Figure 5:
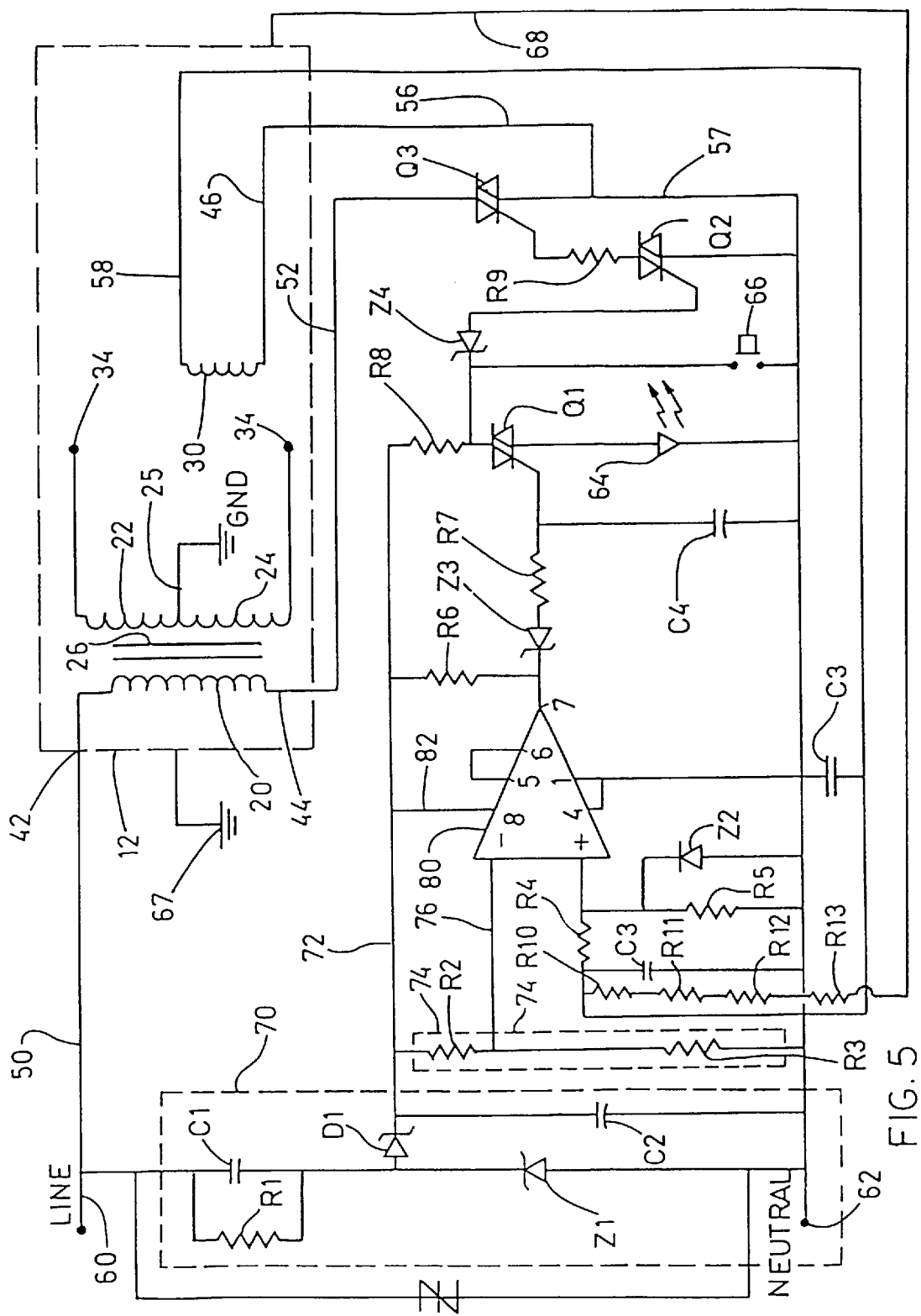
FIG. 5 is a circuit diagram of a portion of the transformer fault protector shown in FIG. 4.

Referring now to FIG. 5 the detection and switching circuitry is better illustrated. As can be seen, the line conductor 60 extending from the power supply passes through the housing 48 and is directly connected to the primary conductor 42 via the conductor 50 and the cap connector 54. The neutral conductor 62, however is not directly connected to the other primary conductor 44 via conductor 52 and cap connector 54 as will be described.

The line conductor 60 is also connected to the neutral conductor 62 by a voltage regulator and rectifier circuit 70. The regulator and rectifying circuit 70 includes a capacitor C1 and a zener diode Z1 connected in series and extending between the line and neutral conductors. A resistor R1 is connected in parallel with the capacitator C1. A diode D1 has its anode connected between the capacitor C1 and the zener diode Z1 and provides its output to a supply conductor 72. The supply conductor 72 is connected to the neutral conductor 62 via a capacitor C2 as well as by a voltage divider 74 constituted by resistors R2 and R3.

A conductor 76 is connected between the resistors R2 and R3 of the voltage divider 74 and terminates at the inverting terminal of a voltage comparator 80 constituted by an LM311 operational amplifier. The comparator 80 receives its bias from the supply conductor 72 via conductor 82 provides its output to the cathode of another zener diode Z3. A resistor R6 is also connected to the cathode of the zener diode Z3 as well as to the supply conductor 72.

The anode of the zener diode Z3 is connected to the trigger pin of a triac Q1 via a resistor R7 as well as to the neutral conductor 62 via a capacitor C4 and the resistor R7 as well as to the neutral conductor 62 via a capacitor C4 and the resistor R7. One of the other terminals of the triac Q1 is connected to the supply conductor 72 via a resistor R8 while the third terminal of the triac Q1 is connected to the neutral conductor 62 via the LED 64.

A zener diode Z4 has its cathode connected between the resistor R8 and one terminal of the triac Q1 while the other terminal of the zener diode Z4 extends to the trigger pin of a second triac Q2. The cathode of the zener diode Z4 is also connected to the neutral conductor 62 via the reset switch 66. One of the other terminals of the triac Q2 extends to the neutral conductor 62 while the third terminal of the triac Q2 is connected to the trigger pin of yet another triac Q3 via a resistor R9. One of the other terminals of the triac Q3 is connected to the neutral conductor 62 while the third terminal of the triac Q3 is connected to conductor 52. Conductor 52 as mentioned previously is connected to the primary conductor 44 via the cap connector 54 thereby completing the circuit between the primary conductors 42, 44 and the power supply via the line and neutral conductors 60, 62.

Conductor 56, is connected to conductor 46 and is connected via conductor 57 to neutral connector 62. Conductor 57 extending from conductor 56 and coil 30 is connected to the comparator 80 via a capacitor C3 located between the neutral connector 62 and the conductor 58. A parallel circuit including a resistor R5 and another zener diode Z2 extends between the conductor 57 and the comparator 80.

The operation of the transformer 10 will now be described with particular emphasis on the operation of the fault protection device. The present fault protection device is based on electromagnetic principals and the fact that a balanced, midpoint grounded and properly loaded luminous tube transformer will have terminal voltages on each of the two secondary terminals 34 that are equal in magnitude but opposite in phase with respect to the ground when the transformer primary is energized. Thus, if a break, an arcing ground fault or a direct ground fault occurs on either side of the transformer, the balance of the secondary terminal voltages is lost and thus, the fault can be detected.

In typical operation, when the line and the neutral conductors 60, 62 are connected across a 120 volt power supply, the components C1, Z1, D1 and C2 forming the voltage regulator and rectifying circuit 70 act to establish a 15 volt power supply which is applied to the supply conductor 72. When the voltage is established on the supply conductor 72, the voltage divider 74 acts to supply a 0.5 volt threshold voltage to conductor 76 which is in turn applied to the inverting terminal of the comparator 80. This maintains the output of the comparator low until a voltage greater than the threshold voltage is received on the non-inverting terminal of the comparator 80.

The 15 volt supply voltage which is also established at one terminal of the resistor R8 causes zener diode Z4 to go into avalanche so that a gate signal is applied to the trigger pin of triac Q2. When this occurs, triac Q2 closes thereby connecting the primary winding 20 of the transformer 10 between the line and neutral conductors 60, 62 via conductors 50, 42, 44 and 52 respectively so that the transformer primary winding 20 is energized. This of course energizes the transformer secondary windings 22, 24 so that an output voltage is applied to the threaded rods 34 wherein it is conveyed to the transformer load via suitable conductors.

In normal operation, the fluxes produced by the secondary windings 22, 24 are equal in magnitude and opposite in phase. Thus the fluxes of each secondary winding 22, 24, detected in the sensing coil 30, cancel each other. Accordingly, the signal induced in the sensing coil 30 is substantially zero. This zero volt signal is applied to the comparator 80 via conductor 58 and resistor R4. Since the magnitude of the voltage is less than the 0.5 volt threshold voltage applied to the inverting terminal of the comparator 80 via conductor 76, the output of the comparator 80 remains low. The zener diode Z3 which receives the output of the comparator 80 ensures that the trigger pin of triac Q1 remains isolated from the comparator output when the conductors 60, 62 are initially connected across the power supply. This permits the 15 volt power supply voltage to be established on supply conductor 72 and prevents improper operation of the circuit. This course maintains the triac Q1 in an open state so that triac Q2 and Q3 remain in a closed condition to connect the transformer primary winding 20 across the power supply.

However if a fault occurs, the fluxes in the core under each secondary winding will vary in magnitude resulting in a net voltage being induced in the sensing coil 30. The signal applied to the conductors 56, 57 from the sensing coil 30 presents a positive voltage to the non-inverting terminal of the comparator 80. The capacitor C3 functions to reduce the voltage in the sensing coil 30, to levels acceptable to comparator 80. The zener diode Z2 in the avalanche mode limits the voltage applied to the comparator 80 to a magnitude equal to approximately 15 volts while in the forward direction and limits the negative voltage applied to the comparator 80 at approximately—1 volt. The resistor R5 functions to drain any residual charge on capacitator C3 when the voltage on conductors 56 and 57 drops low.

If the voltage applied to the non-inverting terminal of the comparator 80 exceeds 0.5 volts at any time as will typically occur when a fault occurs, the comparator 80 output goes high. The high output of the comparator 80 is applied to the cathode of zener diode Z3 causing it to go into avalanche thereby placing a voltage on the trigger pin of triac Q1. This causes the triac Q1 to conduct. Once triac Q1 begins to conduct, the zener diode Z4 moves out of an avalanche state thereby removing the bias on the trigger pin of triac Q2 causing the triac Q2 to open. This of course results in the removal of the bias on the trigger pin of Q3 which in turn results in triac Q3 opening. When this occurs, the transformer primary winding 20 is isolated from the power supply since the neutral conductor 62 becomes isolated from the line conductor 60.

When triac Q1 becomes energized, the current previously applied to triac Q2 via resistor R8 and zener diode Z4 is diverted through the LED 64 thereby turning it on to indicate a fault. When the fault is corrected and the output of the comparator 80 once again drops low, the switch 66 can be depressed to reset the circuit. When this is done, the triac Q1 is shorted causing it to stop conducting. When the switch 66 is released, the zener diode Z4 goes into avalanche once again thereby applying a trigger signal to triac Q2. Once this is done, the triac Q3 will conduct as explained previously thereby connecting the transformer primary winding between the line and neutral conductors 60, 62 respectively extending from the power supply.

As a further safety feature, the housing 12 is connected as at 68 to the comparator 80, (see FIG. 5) through resistances R10, R11, R12 and R13. If there is a failure in the regular ground 67, the action of the secondaries, within the housing, sets up a capacitive voltage on the housing. If this voltage exceeds the 0.5 volt threshold the output of comparator 80 becomes high and trips the relay, thus disconnecting power to the primary.

Figure 6:
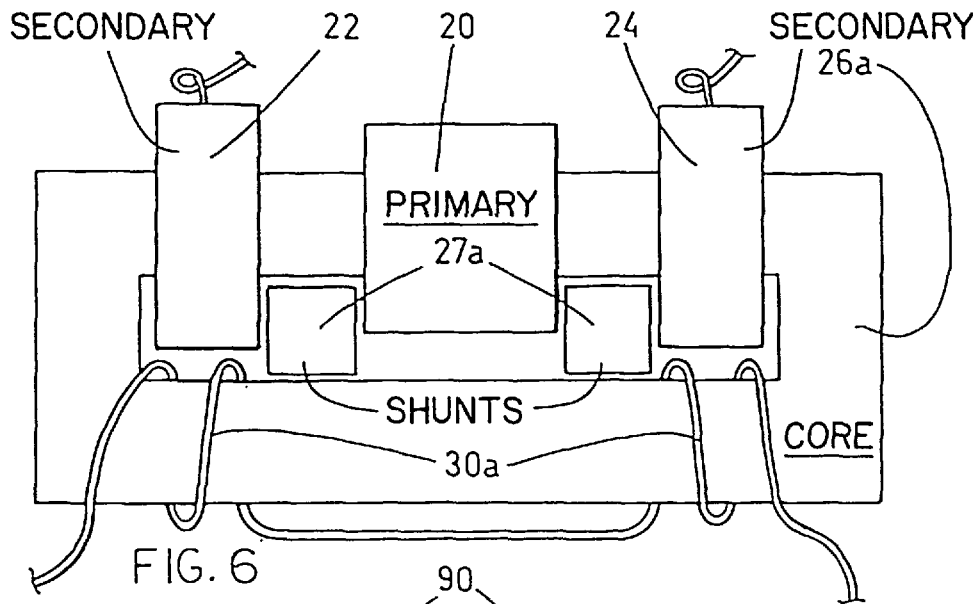
FIG. 6 is a schematic side elevation of an alternate embodiment, using a sensing coil wound around the magnetic core.

In a further embodiment as shown in FIG. 6 the sensing coils 30A may be wound around the magnetic core 26A itself beside shunts 27A and will still achieve the same result of sensing the fluxes resulting from the respective secondaries.

Figure 7:
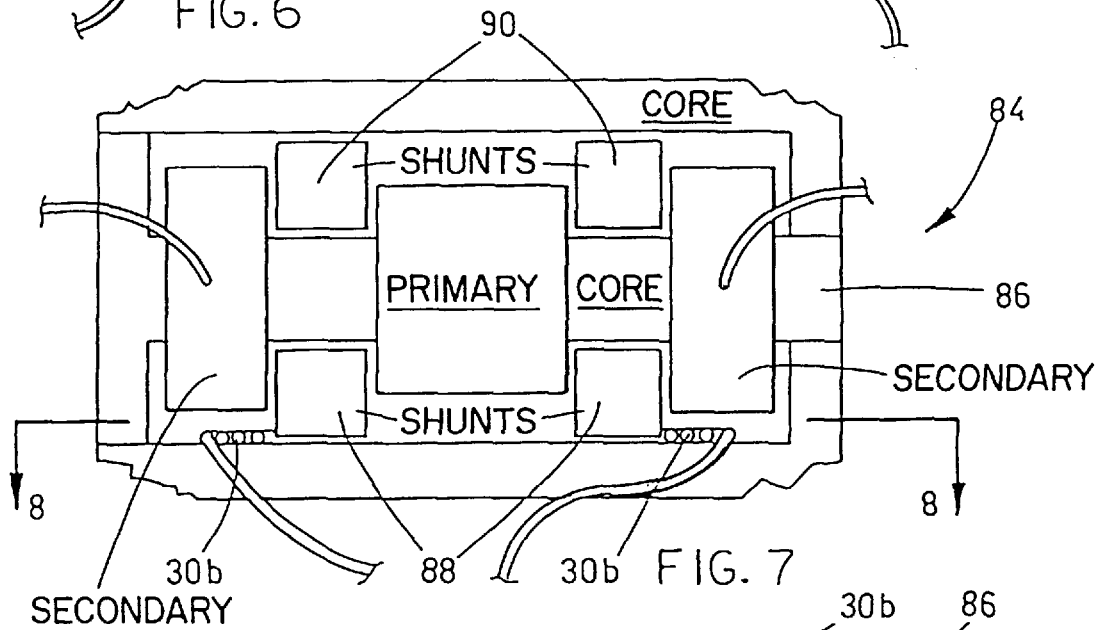
FIG. 7 is a schematic side elevation of an alternate embodiment for use with a transformer having a shell type core.
Figure 8:
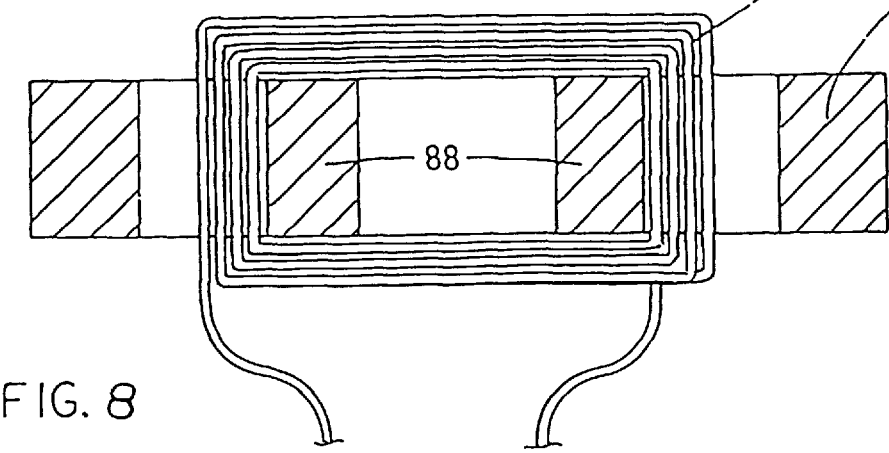
FIG. 8 is a section along the line 8—8 of FIG. 7.

In a further embodiment as shown in FIGS. 7 and 8 the invention may be applied to a transformer 84 having a shell type core 86 extending all around coils 20, 22 and 24. In this type of transformer there are four shunts 88—88 and 90—90. The arrangement of the sensing coil 30B in this embodiment is similar to FIGS. 1 to 5. The tripping circuit is also similar to FIG. 5.

Figure 9:
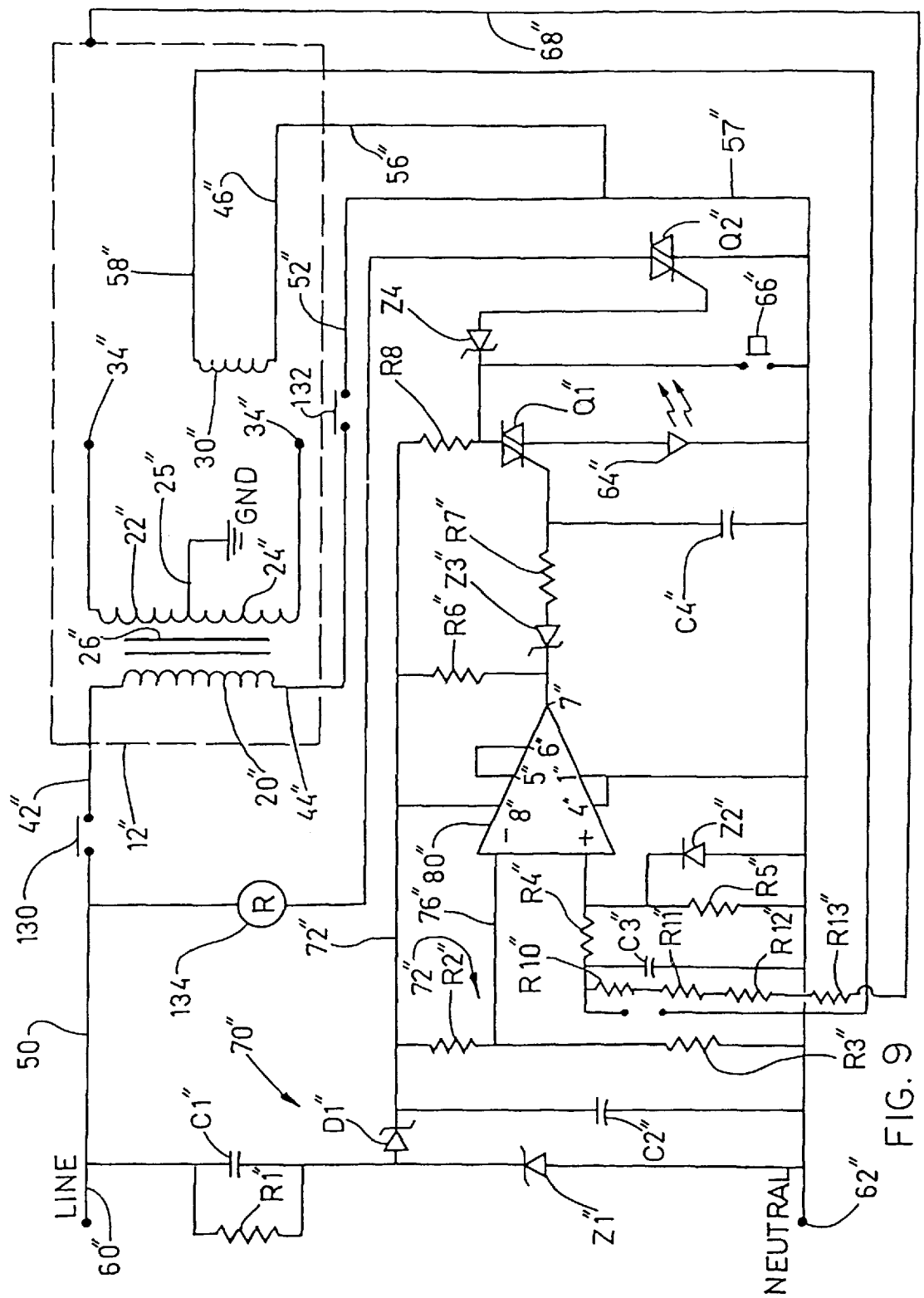
FIG. 9 is a circuit diagram of an alternate form of circuit breaker using relays to break both connections to the primary simultaneously.

FIG. 9 illustrates a further form of tripping circuit using relays to break the circuit to both sides of the primary simultaneously.

In this embodiment, like reference numerals will be used to indicate like components with a" added for clarity.

The circuit shown in FIG. 9 is for use in applications wherein both terminals of the transformer primary winding 20" must be disconnected from the power supply upon detection of a transformer fault. As can be seen the fault protector includes a pair of relay contacts 130, 132, one relay contact 130 being connected in series with the line conductor 60" and the primary conductor 42" and the other relay contact 132 being connected in series with the primary conductor 44" and the neutral connector 62". In this embodiment, the relay contacts 130, 132 replace the triac Q3 and thus, this circuit is substantially the same as the previous circuits except that one terminal of triac Q2" is connected to the line conductor 60" via relay coil 134 as opposed to the trigger pin of triac Q3.

In normal operation when the transformer secondary windings 22" and 24" are balanced, and the voltage applied to conductor 56" by the sensing coil 30" is insufficient to cause comparator 80" to trigger triac Q1" to an on condition, triac Q2" remains in a closed condition. This of course allows current to flow from the line conductor 60" through triac Q2" to the neutral conductor 62" via the relay coil 134. Once the relay coil 134 becomes energized, the relay contacts 130, 132 close therby connecting the transformer primary winding 20" to the power supply via the line and neutral conductors 60" and 62" respectively.

However, when a fault occurs and the secondary winding voltages are no longer balanced, the output of the comparator 80" triggers triac Q1" thereby opening triac Q2". When this occurs, current flow through the relay coil 134 stops causing the relay contacts 130, 132 to open thereby isolating both terminals of the transformer primary winding 20" from the power supply. As in the previous embodiments, once the triac Q1" closes, current is fed through the LED 64" causing it to illuminate. In addition, once the transformer fault has been removed and the comparator 80" output drops low, actuation of the switch 66" resets the circuit so that the transformer primary winding 20" is reconnected to the power supply via the line and neutral conductors.

As should be apparent, the present invention provides an economical and relatively simple circuit incorporated in a transformer for detecting faults and for isolating the transformer primary winding from the power supply when a fault occurs. This of course substantially eliminates the risk of electrical shock and the occurrence of fires due to a fault condition. In addition, since a flux sensing coil is used to detect a fault condition based on electromagnetics, direct connection of the fault protector to the high voltage secondary windings is not required thereby facilitating the implementation of the fault protector in existing transformers and the implementation when manufacturing transformers incorporating the fault protector.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A fault protection device incorporated in a transformer having a primary winding and at least two secondary windings, said secondary windings defining sides and ends and being located on either side of said primary winding and being connected to ground, and having a generally closed loop core having a central core portion extending through said primary winding and
said secondary windings, and having a further core loop portion extending around one side of said primary and said secondary windings and said closed loop joining around said secondary windings said secondary windings generating magnetic fluxes when in use, said fault protection device comprising:

a flux sensing coil in turn comprising two flux sensing coil portions, each said coil portion being positioned on said further core loop portion between said core loop portion and sides of respective said secondary windings and operable to sense the fluxes generated by respective said secondary windings, said coil portions being connected to one another and generating a zero signal when the fluxes of respective said secondary windings are equal, and generating a flux signal when an imbalance in the fluxes generated by respective said secondary windings is detected by said coil portions; and switch means connected to respond to said signals in said sensing coil and connected in series with a power supply and at least one terminal of said primary winding, said switch means being conditioned to an open condition in response to said flux signal to isolate said primary winding from said power supply.

2. A fault protection device as claimed in claim 1 wherein said core includes two shunt portions, located on either side of said primary winding between said primary winding and respective said secondary windings, and wherein said sensing coil is wound so that one said sensing coil portion extends around one of said shunt portions and another sensing coil portion extends around the other of said shunt portions.

3. A fault protection device as claimed in claim 1 wherein a first sensing coil portion is wound around a portion of said core loop portion adjacent a first said secondary winding, and a second sensing coil portion is wound around said core loop portion adjacent a second said secondary winding.

4. A fault protection device as claimed in claim 1, wherein said sensing coil is provided with two output wires, said wires being connected to said switch means, whereby said switch means is positioned in circuit with said sensing coil.

5. A fault protection device as claimed in claim 1 wherein said sensing coil portions respond to said variations in said fluxes of said secondary windings by inducing a positive voltage in one said sensing coil portion and a negative voltage in the other said sensing coil portion, said voltages balancing out when said secondary windings are operating normally.

6. A fault protection device as claimed in claim 1 and wherein said switch means comprises electronic circuit means, said electronic circuit means including comparator means connected in circuit with a reference coil, voltage, and further connected in circuit with said sensing, and being conditioned whereby when said flux signal becomes higher than said reference voltage, said comparator means operates to isolate said primary winding from said power supply.

7. A fault protection device incorporated in a transformer having a primary winding and at least two secondary windings, said secondary windings being defining sides and two ends and being located on either side of said primary winding and being connected to ground, and having a generally closed loop core having a central core portion extending through said primary winding and said secondary windings, and having a further core loop portion extending around one side of said primary and said secondary windings and said closed loop defining loop ends around said secondary windings, and shunt core portions extending across said closed loop core located between said primary winding and respective said secondary windings, said secondary windings generating magnetic fluxes when in use, said fault protection device comprising:

a flux sensing coil in turn comprising two flux sensing coil portions, each said coil portion being located on a part of said further core loop portion between said shunt core portions and sides of adjacent respective said secondary windings and operable to sense the fluxes generated by respective said secondary windings, said coil portions being connected to one another and generating a zero signal when the fluxes of respective said secondary windings are equal, and generating a flux signal when an imbalance in the fluxes generated by respective said secondary windings is detected by said coil portions; and switch means connected to respond to said signals in said sensing coil a and connected in series with a power supply and at least one terminal of said primary winding, said switch means being conditioned to an open condition in response to said flux signal to isolate said primary winding from said power supply.

8. A fault protection device as claimed in claim 7 and wherein said switch means comprises comparator means connected to receive a standard reference voltage, and connected to receive said flux signal from said sensing coil, and when said flux signal exceeds said reference voltage, said comparator triggers operation of circuit relays, thereby disconnecting both sides of said primary winding.

9. A fault protection device incorporated in a transformer having a primary winding and at least two secondary windings, said secondary windings defining sides and two ends and being located on either side of said primary winding and being connected to ground, and having a central core portion extending through said primary winding and said secondary windings and having a closed loop core portion extending around both sides of said primary winding and said secondary windings, and joining with said central core portion, and having four shunt portions, arranged in pairs, a first pair of shunt portions being located between said primary winding and said secondary windings and extending from one portion of said closed loop core portion to said central core portion, and said second pair of shunt portions being located between the other said closed loop core portions and said primary and said secondary windings and extending from said closed loop portion to said central core portion, said secondary windings generating magnetic fluxes when in use, said fault protection device comprising:

a flux sensing coil in turn comprising two flux sensing coil portions, each said coil portion being located on a said closed loop core portion adjacent sides of said secondary windings and extending around adjacent ones of said shunt portions between said closed loop core portion and respective said secondary windings and operable to sense the fluxes generated by respective said secondary windings, said coil portions being connected to one another and generating a zero signal when the fluxes of respective said secondary windings are equal, and generating a flux signal when an imbalance in the fluxes generated by respective said secondary windings is detected by said coil portions; and switch means connected to respond to said signals in said sensing coil a and connected in series with a power supply and at least one terminal of said primary winding, said switch means being conditioned to an open condition in response to said flux signal to isolate said primary winding from said power supply.

10. A fault protection device as claimed in claim 9 and wherein said switch means comprises comparator means connected to receive a standard reference voltage, and connected to receive said flux signal from said sensing coil, and when said flux signal exceeds said reference voltage, said comparator triggers operation of circuit relays, thereby disconnecting both sides of said primary winding.

* * * * *